United States Patent
Jackson et al.

[11] Patent Number: 6,001,492
[45] Date of Patent: Dec. 14, 1999

[54] GRADED BOND COAT FOR A THERMAL BARRIER COATING SYSTEM

[75] Inventors: Melvin Robert Jackson, Niskayuna; Ann Melinda Ritter, Albany; Michael Francis Xavier Gigliotti, Jr., Scotia, all of N.Y.

[73] Assignee: General Electric Company, Schenectady, N.Y.

[21] Appl. No.: 09/035,800

[22] Filed: Mar. 6, 1998

[51] Int. Cl.$^6$ .............................. B32B 15/04; F01D 5/28
[52] U.S. Cl. ...................... 428/610; 428/615; 428/623; 428/632; 428/633; 428/667; 428/678; 428/680; 416/241 B
[58] Field of Search ...................... 428/610, 615, 428/623, 632, 633, 668, 667, 678, 680; 416/241 B, 241 R

[56] References Cited

U.S. PATENT DOCUMENTS

| | | | |
|---|---|---|---|
| 4,109,031 | 8/1978 | Marscher | 427/191 |
| 4,248,940 | 2/1981 | Goward et al. | 428/633 |
| 4,481,237 | 11/1984 | Bosshart et al. | 427/376.4 |
| 4,592,964 | 6/1986 | Buran et al. | 428/610 |
| 5,304,039 | 4/1994 | Corderman et al. | |
| 5,305,726 | 4/1994 | Scharman et al. | 133/668 |
| 5,320,909 | 6/1994 | Scharman et al. | 428/472 |
| 5,455,000 | 10/1995 | Seyferth et al. | 419/36 |
| 5,561,321 | 10/1996 | Hirano et al. | 257/700 |
| 5,912,087 | 6/1999 | Jackson et al. | 428/610 |

*Primary Examiner*—Timothy Speer
*Assistant Examiner*—Bryant Young
*Attorney, Agent, or Firm*—Noreen C. Johnson; Douglas E. Stoner

[57] ABSTRACT

A bond coat (20) of a thermal barrier coating system for components designed for use in a hostile thermal environment, such as turbine, combustor and augmentor components of a gas turbine engine. The composition of the bond coat (20) has graded thermal expansion properties that moderate the transition between a metal substrate (10) and a thermal-insulating ceramic layer (12) of a TBC protecting the substrate (10), while also reducing the service temperature of the bond coat (20) so as to reduce its rate of oxidation. Preferably, the bond coat (20) has multiple layers (20a, 20b, 20c), with the coefficients of thermal conductivity of the individual bond coat layers (20a, 20b, 20c) being very close to that of the substrate (10) in order to promote heat transfer from the outward layer (20c) of the bond coat (20) to the substrate (10). By minimizing the service temperature of the bond coat (20) while grading the thermal expansion properties through the coating system, a more spall-resistant coating system is achieved. The inward layer (20a) of the bond coat (20) preferably contains a metallic constituent, such as an aluminum and/or chromium-containing intermetallic, MCrAl and/or MCrAlY, a middle layer (20b) of the bond coat (20) also contains the metallic constituent in addition to a chromium phase, and an outward layer (20c) of the bond coat (20) contains the chromium phase and at least one platinum-containing phase. The middle and outermost layers (20b, 20c) may also contain chromium carbides such as $Cr_3C_2$.

20 Claims, 4 Drawing Sheets

6,001,492

GRADED BOND COAT FOR A THERMAL BARRIER COATING SYSTEM

FIELD OF THE INVENTION

The present invention relates to protective coatings for components exposed to high temperatures, such as components of a gas turbine engine. More particularly, this invention is directed to a thermal barrier coating system that incorporates a graded bond coat whose thermal conductivity and thermal expansion properties are tailored to promote spall resistance of the coating system.

BACKGROUND OF THE INVENTION

The operating environment within a gas turbine engine is both thermally and chemically hostile. Significant advances in high temperature alloys have been achieved through the formulation of iron, nickel and cobalt-base superalloys, though components formed from such alloys often cannot withstand long service exposures if located in certain sections of a gas turbine engine, such as the turbine, combustor or augmentor. A common solution is to protect the surfaces of such components with an environmental coating system, such as an aluminide coating or a thermal barrier coating system (TBC). The latter includes an environmentally-resistant bond coat and a layer of thermal-insulating ceramic applied over the bond coat. Bond coats are typically formed from an oxidation-resistant alloy such as MCrAlY where M is iron, cobalt and/or nickel, or from a diffusion aluminide or platinum aluminide that forms an oxidation-resistant intermetallic. Metal oxides, such as zirconia ($ZrO_2$) that is partially or fully stabilized by yttria ($Y_2O_3$), magnesia (MgO) or another oxide, have been widely employed as the material for the thermal-insulating ceramic layer. The ceramic layer is typically deposited by air plasma spraying (APS), low pressure plasma spraying (LPPS), or a physical vapor deposition (PVD) technique, such as electron beam physical vapor deposition (EBPVD) which yields a strain-tolerant columnar grain structure.

Bond coats formed with the above-noted compositions protect the underlying superalloy substrate by forming an oxidation barrier for the underlying superalloy substrate. The aluminum content of these bond coat materials provides for the slow growth of a strong adherent continuous aluminum oxide layer (alumina scale) at elevated temperatures. This thermally grown oxide (TGO) protects the bond coat from rapid oxidation and hot corrosion, and chemically bonds the ceramic layer to the bond coat. Though bond coat materials are particularly alloyed to be oxidation-resistant, the oxidation that occurs over time at elevated temperatures gradually depletes aluminum from the bond coat. Eventually, the level of aluminum within the bond coat is sufficiently depleted to prevent further slow growth of the protective oxide, and to allow for the more rapid growth of nonprotective oxides. At such time, spallation may occur at the interface between the bond coat and the aluminum oxide layer or the interface between the oxide layer and the ceramic layer.

Even without the formation of nonprotective oxides, spallation can occur due to stresses generated by differences in coefficients of thermal expansion of the superalloy substrate, metallic bond coat and ceramic layer, including the thermally-grown aluminum oxide layer. As represented in FIG. 1, a thermal barrier coating system is shown as comprising a ceramic layer 12 adhered to a substrate 10 by a bond coat 14. The coefficients of thermal expansion (CTE or α) of the substrate 10 and metallic bond coat 14 are roughly equal, as are their coefficients of thermal conductivity (k). However, the CTE and thermal conductivity of the ceramic layer 12 are considerably less than that of the substrate 10 and bond coat 14. For example, the CTEs of ceramic materials used to form the ceramic layer 12 are generally on the order of about 50%–60% of that of the materials for the substrate 10 and bond coat 14. The CTE of the protective oxide layer is even lower than that of the ceramic layer 12. Consequently, and as represented in FIG. 1, while little relative expansion occurs at the interface 16a between the substrate 10 and bond coat 14 at elevated temperatures, a considerable difference in expansion occurs at the interface 16b between the bond coat 14 and ceramic layer 12. This difference in expansion generates considerable shear forces that promote spallation of the ceramic layer 12.

As is evident from FIG. 1, the maximum service temperatures of the substrate 10 ($T_2$), bond coat 14 ($T_3$) and the ceramic layer 12 ($T_4$) also differ from each other due to their differences in thermal conductivity. Notably, the temperature $T_4$ at the outer surface of the ceramic layer 12 is considerably higher than the temperature $T_3$ at the interface 16b between the ceramic layer 12 and bond coat 14. The lower service temperature of the bond coat 14 reduces its rate of oxidation, and therefore promotes the overall service life of the coating system.

To reduce the difference in thermal expansion between the ceramic layer and bond coat of a thermal barrier coating system, graded bond coats have been proposed in the prior art. An example of such a coating system is represented in FIG. 2, which shows a bond coat 14 composed of inner and outer layers 14a and 14b. The conventional practice has been to formulate the inner and outer layers 14a and 14b to have CTEs between that of the substrate 10 and ceramic layer 12, with the CTE of the inner layer 14a being closer to that of the substrate 10 and the CTE of the outer layer 14b being closer to that of the ceramic layer 12. For example, the inner layer 14a may have a composition of about two parts bond coat alloy and one part metal oxide, while the outer layer 14b would have a composition of about one part bond coat alloy and two parts metal oxide. The resulting advantageous "graded" effect on thermal expansion is schematically and graphically represented in FIG. 2.

Also shown in FIG. 2 is the effect that the graded bond coat composition has on service temperature. Notably, the bond coat layers 14a and 14b have lower coefficients of thermal conductivity as compared to the bond coat 14 of FIG. 1 due to their inclusion of metal oxides, whose coefficients of thermal conductivity are considerably lower than that of metallic bond coat alloys. Because the bond coat layers 14a and 14b cannot conduct heat as readily to the substrate 10, the service temperature of the bond coat 14 is higher, as shown by the indicated temperatures $T_{3a}$ and $T_{3b}$ for the interfaces 16b and 16c between the inner and outer bond coat layers 14a and 14b, and between the outer layer 14b and the ceramic layer 12, respectively. Accordingly, while the graded bond coat composition of FIG. 2 reduces dissimilarities in thermal expansion, the higher service temperature of the bond coat 14 (often on the order of about a 10 C difference) leads to accelerated oxidation, thus shortening the service life of the coating system.

In view of the above, it can be seen that, while graded bond coat compositions of the past promote the service life of a thermal barrier coating system in one respect, the resulting increase in oxidation rate of the bond coat has a converse effect. Furthermore, the combination of metal and ceramic in graded bond coats produces a bond coat of limited ductility and toughness at the service temperatures encountered in a gas turbine engine Accordingly, what is needed is a bond coat that yields a gradation of thermal expansion between the substrate and ceramic layer of a thermal barrier coating, without raising the service temperature of the bond coat. Such a bond coat would also preferably exhibit ductile behavior over a large portion of its service temperature range to allow for stress relaxation.

SUMMARY OF THE INVENTION

According to the present invention, there is provided a bond coat of a thermal barrier coating system (TBC) for components designed for use in a hostile thermal environment, such as turbine, combustor and augmentor components of a gas turbine engine. The composition of the bond coat has graded thermal expansion properties that moderate the transition between a metal substrate and a thermal-insulating ceramic layer of a TBC protecting the substrate, while also reducing the service temperature of the bond coat so as to reduce its rate of oxidation. Consequently, the bond coat of this invention yields a thermal barrier coating system that is highly resistant to spallation.

A thermal barrier coating system in accordance with this invention generally includes a bond coat adhering a thermal-insulating layer to a substrate. As is conventional for gas turbine components, the substrate is preferably a material that exhibits high strength at elevated temperatures, such as a cobalt, nickel or iron-base superalloy, though it is foreseeable that other materials could be used. The thermal-insulating layer is preferably a ceramic material, as is also conventional in the art. Because the substrate is metallic and the thermal-insulating layer is ceramic, their coefficients of thermal expansion (CTE or α) and conductivity (k) differ considerably.

Adhering the ceramic layer to the substrate is a bond coat comprising at least three layers. As used herein, these layers can be discrete layers of a multilayer bond coat, or more generally three successive regions of a continuously graded structure (which can be considered a multilayer bond coat having an infinite number of "layers"). For simplicity, the terms "layer" and "layers" will be used but understood to apply to each of these bond coat structures. The compositions of the three bond coat layers differ in order to grade the thermal expansion properties between the substrate and ceramic layer. More particularly, the compositions of the bond coat layers are tailored to achieve the following relationships:

$\alpha_s > \alpha_{b1}$, $\alpha_{b2}$ and $\alpha_{b3}$ $\alpha_t < \alpha_{b1}$, $\alpha_{b2}$ and $\alpha_{b3}$, and $k_{b1}$, $k_{b2}$, and $k_{b3}$ are much closer to $k_s$ than $k_t$, where:

$\alpha_s$ is the coefficient of thermal expansion of the substrate;

$k_s$ is the coefficient of thermal conductivity of the substrate;

$\alpha_{b1}$, $\alpha_{b2}$ and $\alpha_{b3}$ are the coefficients of thermal expansion of the layers of the bond coat, $\alpha_{b1}$ being the CTE of a relatively more inward layer (closer to the substrate), $\alpha_{b3}$ being the CTE of a relatively more outward layer, and $\alpha_{b2}$ being the CTE of a layer between the inward and outward layers;

$k_{b1}$, $k_{b2}$ and $k_{b3}$ are the coefficients of thermal conductivity of the inward, middle and outward bond coat layers, respectively;

$\alpha_t$ is the coefficient of thermal expansion of the thermal-insulating layer; and $k_t$ is the coefficient of thermal conductivity of the thermal-insulating layer, where $k_t$ generally much less than $k_s$, generally not more than $0.1k_s$.

The compositions of the three layers of the bond coat differ. The inward layer preferably contains a metallic constituent, such as an aluminum and/or chromium-containing intermetallic, MCrAl and/or MCrAlY, which are capable of forming adhesion-promoting alumina and/or chromia at the interface between the bond coat and thermal-insulating layer. The middle layer also contains the metallic constituent in addition to a chromium phase. Finally, the outward layer contains the chromium phase and at least one platinum-containing phase. The chromium phase and the platinum-containing phase are characterized by a relatively high coefficient of thermal conductivity (k) and relatively low CTE (α), i.e., a coefficient of thermal conductivity closer to $k_s$ (the coefficient of thermal conductivity of the substrate) and a coefficient of thermal expansion closer to $\alpha_t$ (the coefficient of thermal expansion of the thermal-insulating layer). A preferred chromium phase is α-Cr, while preferred platinum-containing phases include (Pt,Ni)Al and (Ni,Pt,Cr,Al).

As a result of the above compositions, the coefficients of thermal conductivity of the bond coat layers ($k_{b1}$, $k_{b2}$ and $k_{b3}$) are very close to that of the substrate ($k_s$), and preferably within about 20% of $k_s$ in order to promote heat transfer from the outward layer of the bond coat to the substrate, which serves as a heat sink. In a preferred embodiment, $k_{b1}$, $k_{b2}$ and $k_{b3}$ are approximately equal to $k_s$, such that the service temperature of the bond coat is very nearly equal to that of the surface of the substrate.

Finally, by grading the compositions of the bond coat layers such that $\alpha_s > \alpha_{b1} > \alpha_{b2} > \alpha_{b3} > \alpha_t$, the expansion of the TBC system is fully graded at elevated service temperatures. By appropriately combining constituents that exhibit ductility at elevated temperatures, stresses generated at interfaces between layers of the TBC system can be relaxed at service temperatures encountered by the bond coat. Furthermore, by minimizing the service temperature of the bond coat while grading the thermal expansion of the layers that form the TBC system, a more spall-resistant TBC system is achieved. Moreover, the conductivity and expansion properties of the individual bond coat layers can be varied independently through the use of different relative amounts of the constituents, such that the stress distribution and temperature profile through the thermal barrier coating system can be developed nearly independently of each other.

Other objects and advantages of this invention will be better appreciated from the following detailed description.

DETAILED DESCRIPTION OF THE INVENTION

The present invention is generally applicable to metal components that are protected from a thermally and chemically hostile environment by a thermal barrier coating system. Notable examples of such components include the high and low pressure turbine blades (buckets) and vanes (nozzles), shrouds, combustor liners and augmentor hardware of gas turbine engines. While the advantages of this invention are particularly applicable to gas turbine engine components, the teachings of this invention are generally applicable to any component on which a thermal barrier may be used to thermally insulate the component from its environment.

Figure 3:
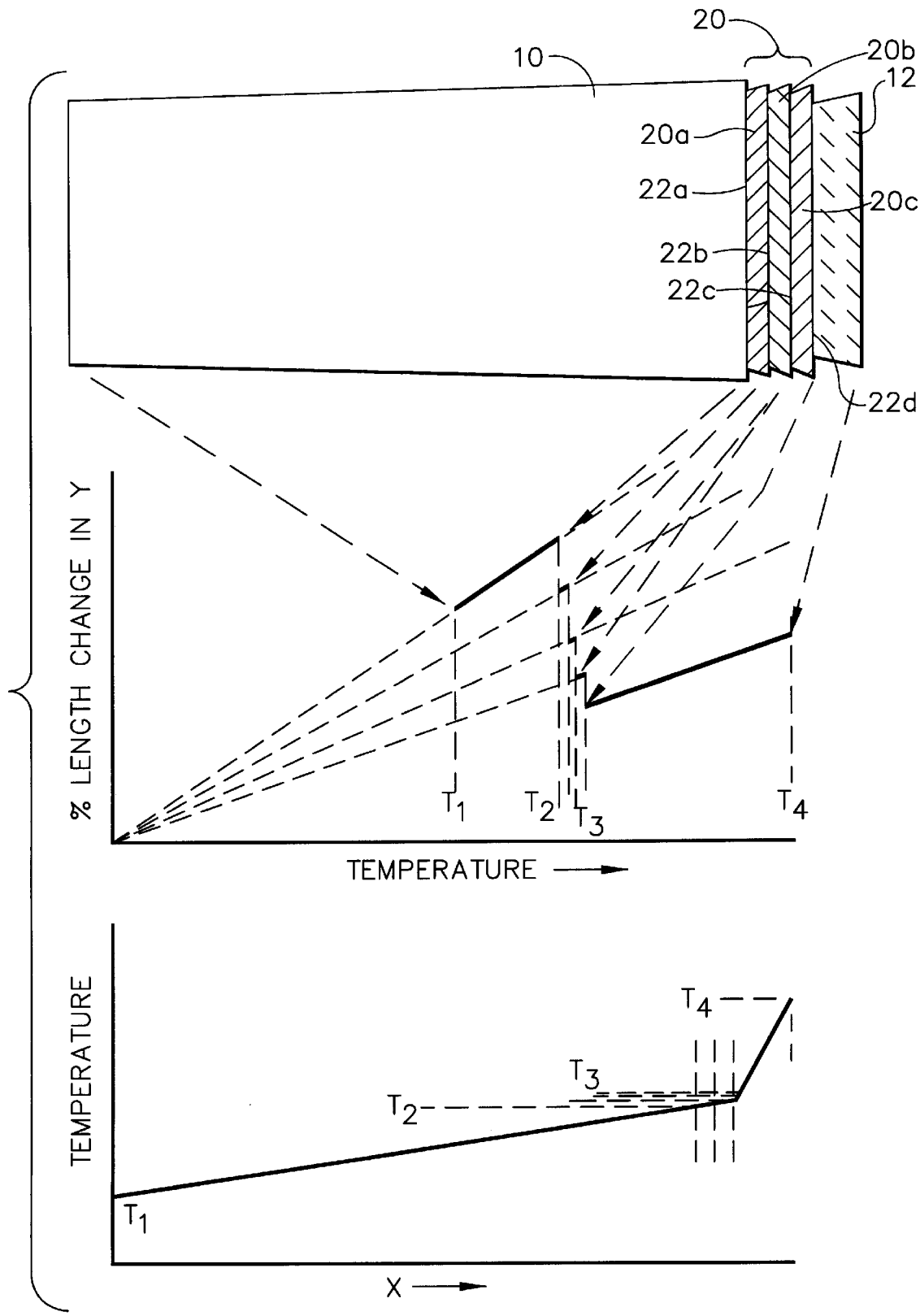
FIG. 3 schematically and graphically illustrates the service temperatures and thermal expansions of the individual layers of a thermal barrier coating system having a graded bond coat of discrete layers in accordance with the present invention.

A partial cross-section of a gas turbine engine component having a thermal barrier coating system in accordance with this invention is represented in FIG. 3. The coating system is shown as including a thermal-insulating layer 12 bonded to a substrate 10 with a multilayer bond coat 20. As is the situation with high temperature components of a gas turbine engine, the substrate 10 may be formed of an iron, nickel or cobalt-base superalloy, though it is foreseeable that other high temperature materials could be used. The thermal-insulating layer 12 is preferably a ceramic material deposited by physical vapor deposition using techniques known in the art, e.g., EBPVD, to yield a strain-tolerant columnar grain structure. Alternatively, the ceramic material could be deposited by other known processes, such as air plasma spraying (APS) and low pressure plasma spraying (LPPS). A preferred ceramic material for the thermal-insulating layer 12 is an yttria-stabilized zirconia (YSZ), though other ceramic materials could be used, including yttria, partially stabilized zirconia, or zirconia stabilized by other oxides, such as magnesia (MgO), ceria ($CeO_2$) or scandia ($Sc_2O_3$).

The bond coat 20 must be oxidation-resistant so as to be capable of protecting the underlying substrate 10 from oxidation and to enable the thermal-insulating layer 12 to more tenaciously adhere to the substrate 10. Prior to depositing the thermal-insulating layer 12, an alumina ($Al_2O_3$) scale (not shown) may be formed on the surface of the bond coat 20 by exposure to elevated temperatures. The scale provides a surface to which the thermal-insulating layer 12 more tenaciously adheres, and emulates the thermally-grown oxide that will form between the thermal-insulating layer 12 and the bond coat 20 during high temperature service. For this purpose, the bond coat 20 preferably contains alumina- and/or chromia-formers, i.e., aluminum, chromium and their alloys and intermetallics. Known bond coat materials include diffusion aluminides and MCrAlY, where M is iron, cobalt and/or nickel.

For illustrative purposes, FIG. 3 shows the bond coat 20 of this invention as being composed of three discrete layers, an innermost layer 20a, an outermost layer 20c and a middle layer 20b, though a greater number of bond coat layers can be employed. Alternatively, the bond coat 20 of FIG. 3 could be continuously graded to have an infinite number of "layers," with the innermost and outermost layers 20a and 20c identifying relatively more inward and relatively more outward layers or regions, respectively, of the bond coat 20. Accordingly, bond coats having multiple discrete layers and those having continuously graded compositions are both within the scope of this invention. While the terms "layer" and "layers" will be used in reference to the discrete regions of the bond coat 20 shown in FIG. 3, these terms are to be understood to also encompass regions of a continuously graded bond coat. Also, while the layers 20a, 20b and 20c are represented in FIG. 3 as being of equal thickness, any of the layers 20a, 20b and 20c could be significantly thicker than the others.

As is evident from FIG. 3, the layers 20a, 20b and 20c have graded coefficients of thermal expansion ($\alpha$), yet have coefficients of thermal conductivity (k) that are nearly equal to that of the substrate 10. To illustrate, the graph comparing "% LENGTH CHANGE IN Y" (expansion in a plane parallel to the surface of the TBC) with service temperature shows the effect of formulating the bond coat layers 20a, 20b and 20c to have coefficients of thermal expansion ($\alpha_{b1}$, $\alpha_{b2}$ and $\alpha_{b3}$, respectively) between that of the substrate 10 ($\alpha_s$) and thermal-insulating layer 12 ($\alpha_t$), such that $$\alpha_s > \alpha_{b1} > \alpha_{b2} > \alpha_{b3} > \alpha_t$$

Simultaneously, the coefficients of thermal conductivity of the bond coat layers 20a and 20b ($k_{b1}$, $k_{b2}$ and $k_{b3}$, respectively) are closer to that of the substrate 10 ($k_s$) than to the thermal-insulating layer 12 ($k_t$), and preferably within about 20% of $k_s$. The effect of this relationship is evidenced by the linearity between temperatures "$T_1$" and "$T_3$" in the graph showing temperatures through the thickness "X" of the TBC system of FIG. 3. The result is that $T_3$ (the temperature at the interface 22d between the outermost bond coat layer 20c and the thermal-insulating layer 12) is only slightly higher than the temperature (identified as $T_2$) at the interface 22a between the innermost bond coat layer 20a and the substrate 10. These temperatures are in contrast to those of the prior art graded bond coat system illustrated in FIG. 2, where the temperature ($T_{3b}$) at the interface 16c (between the outermost bond coat layer 16b and the thermal-insulating layer 12) is significantly higher (about 10 C) than the temperature ($T_{3a}$) at the interface 16b (between the inner and outermost layers 16a and 16b) and the temperature $T_2$ at the interface 16a (between the innermost bond coat layer 16a and the substrate 10).

Figure 1:
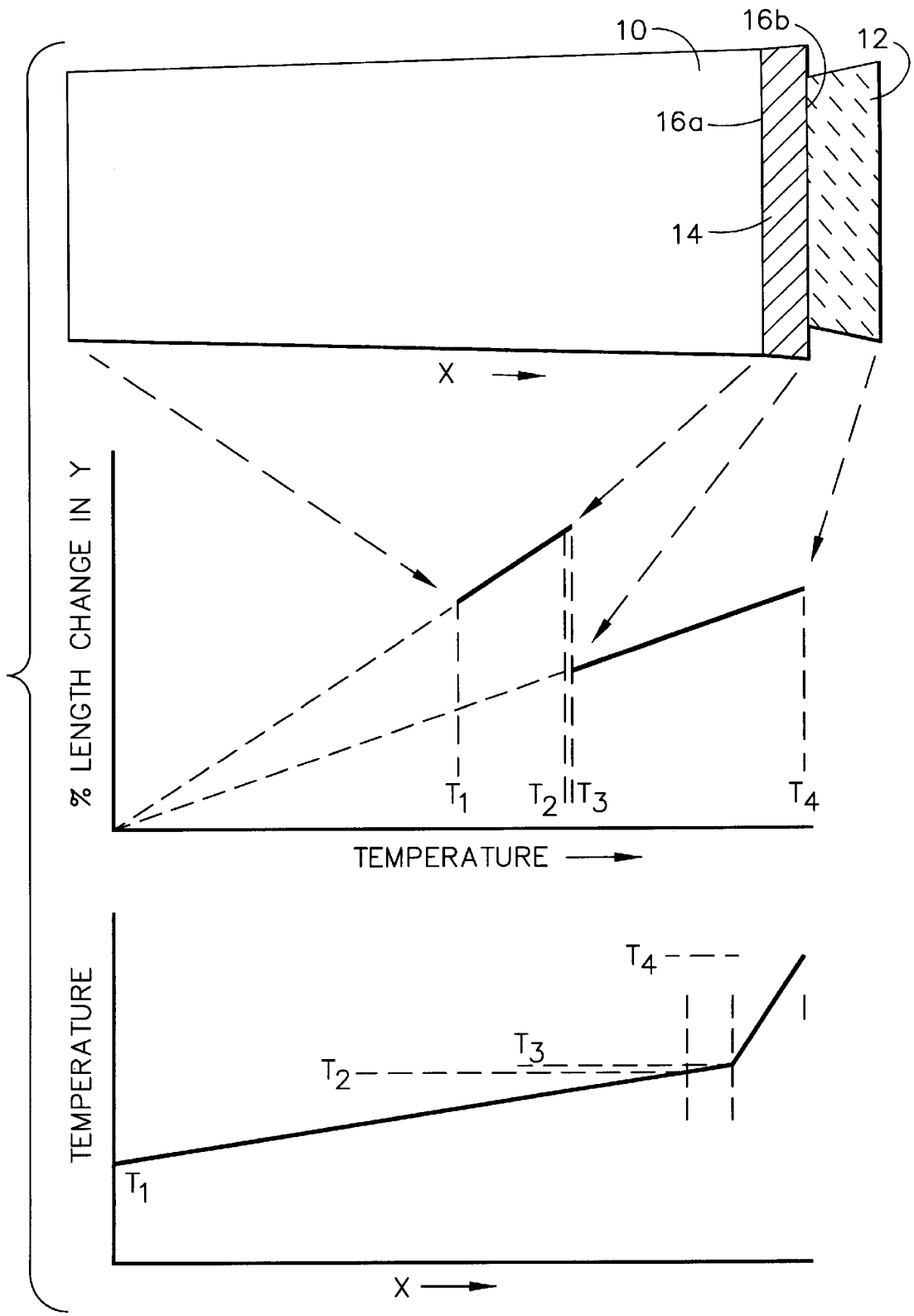
FIG. 1 schematically and graphically illustrates the service temperatures and thermal expansions of the individual layers of a thermal barrier coating system having a single-layer bond coat in accordance with the prior art.
Figure 2:
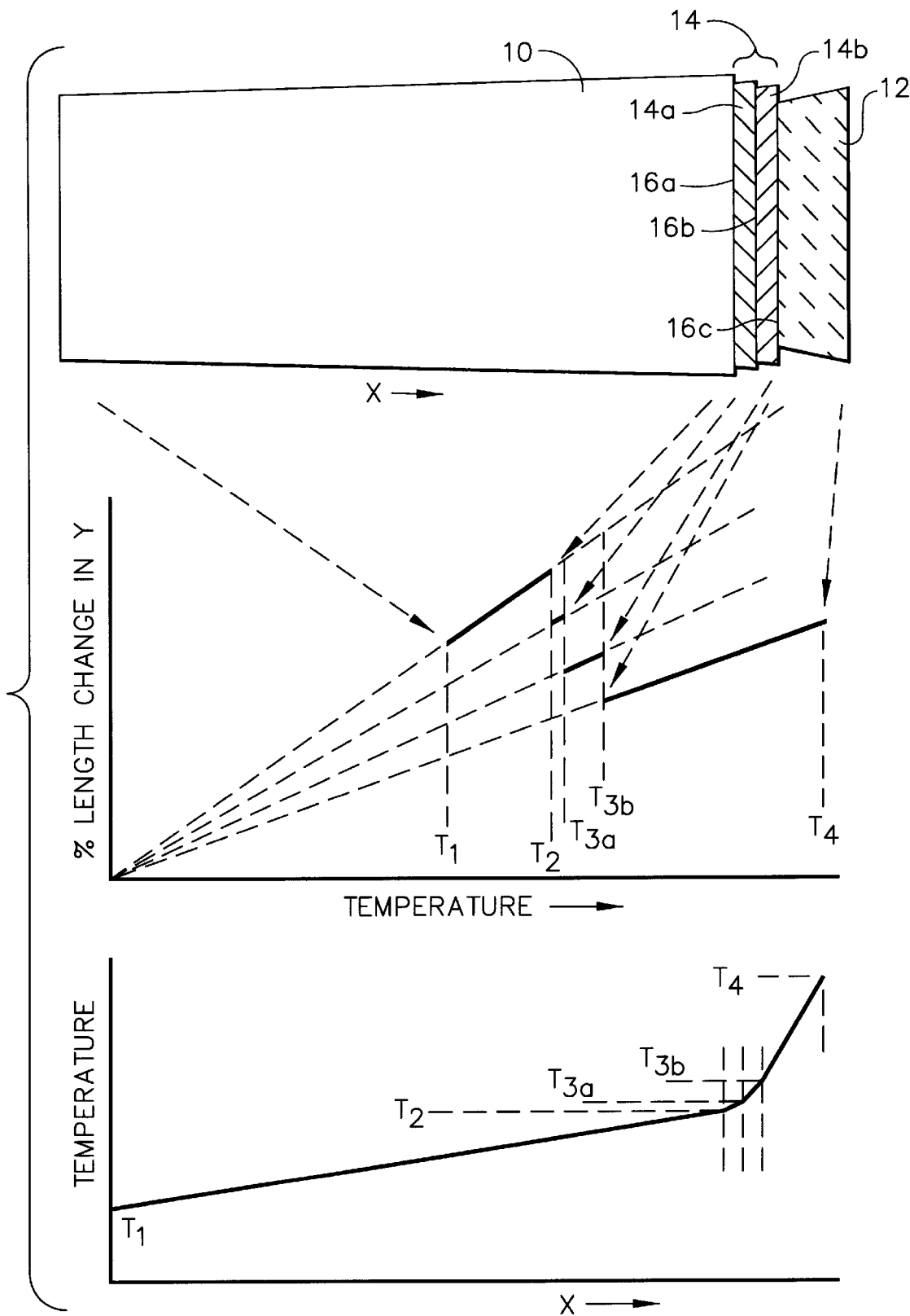
FIG. 2 schematically and graphically illustrates the service temperatures and thermal expansions of the individual layers of a thermal barrier coating system having a graded bond coat in accordance with the prior art.
Figure 4:
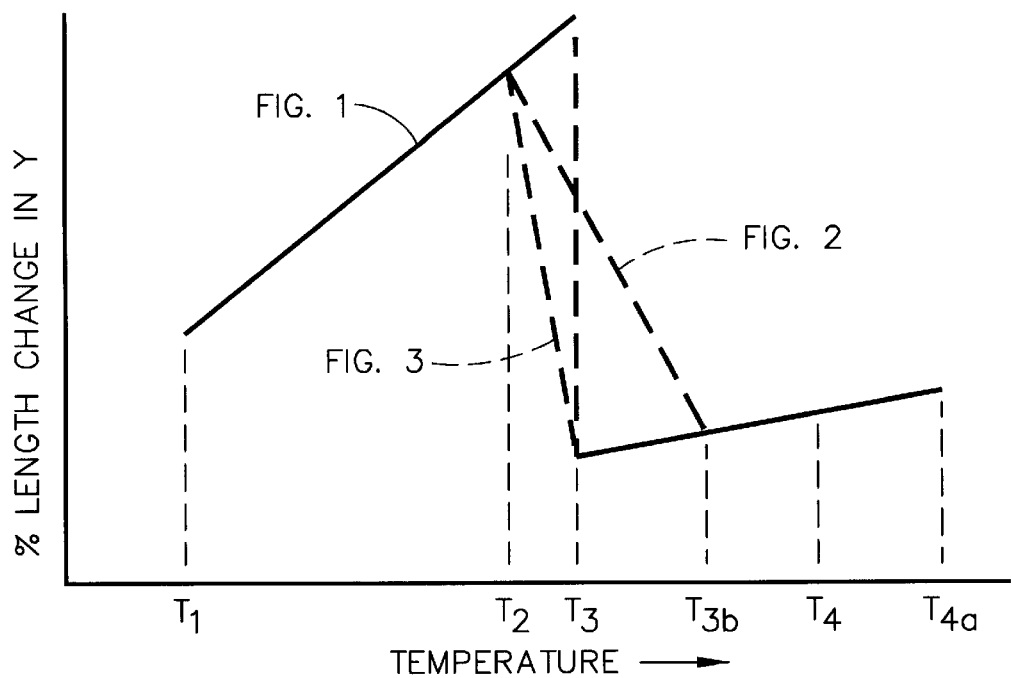
FIG. 4 graphically compares the service temperatures and thermal expansions of the individual layers of the thermal barrier coating systems represented by FIGS. 1, 2 and 3.

The benefit of the improved thermal conductivity of the bond coat 20 is also illustrated in FIG. 4, where "% LENGTH CHANGE IN Y"0 is shown relative to service temperatures for each of the TBC systems represented in FIGS. 1, 2 and 3. Contrary to the single layer bond coat 14 of FIG. 1, the multilayer bond coat 20 of this invention provides a graded transition in thermal expansion, as does the multilayer bond coat 14 of FIG. 2, but with the added benefit that the maximum service temperature $T_3$ of the bond coat 20 is significantly less than the maximum service temperature $T_{3b}$ of the multilayer bond coat 14 of FIG. 2. Furthermore, the maximum service temperature $T_4$ for the thermal-insulating layer 12 of FIG. 3 is also lower than the maximum service temperature $T_{4a}$ of the thermal-insulating layer 12 of FIG. 2.

Figure 5:
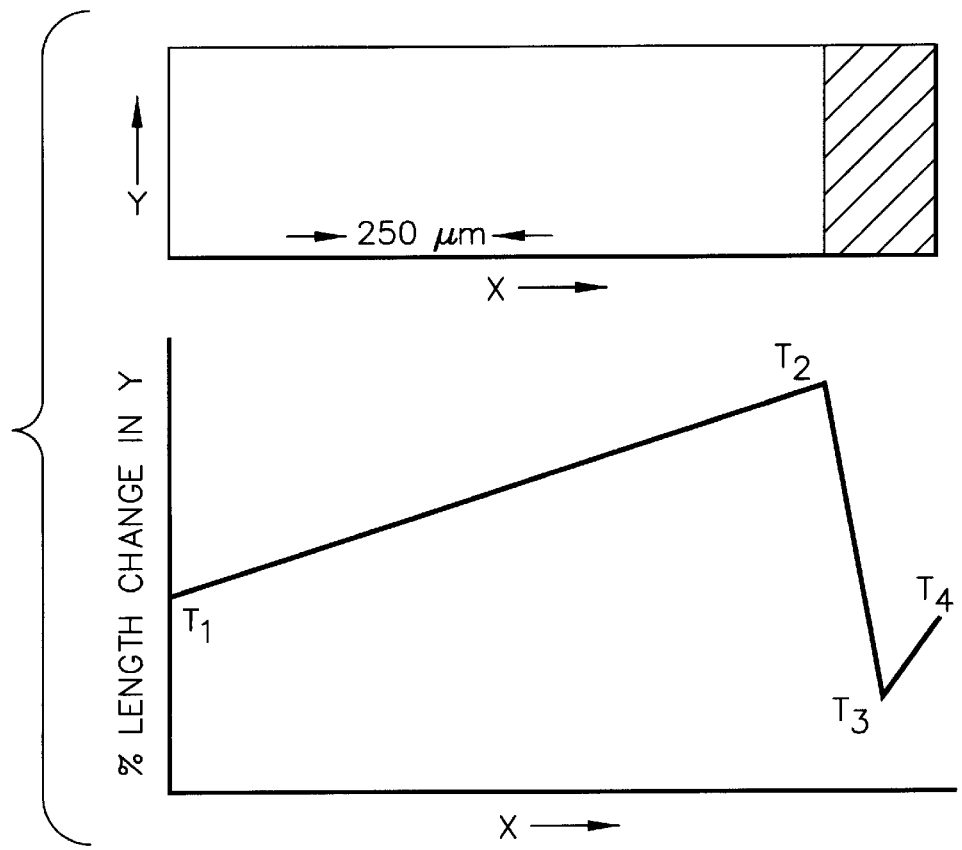
FIG. 5 graphically illustrates the graded thermal expansion characteristics of a thermal barrier coating system having a continuously graded bond coat in accordance with the present invention.

The effect on thermal expansion that a continuously graded bond coat in accordance with this invention has on a TBC system is illustrated in FIG. 5, showing the graduated change in % length change in "Y" through the thickness "X" of the TBC system of FIG. 3. While thermal expansion in the thermal-insulating layer 12 is considerably less than that in the substrate 10, the bond coat 20 of this invention provides a graded transition between the substrate 10 and thermal-insulating layer 12 across the modest service temperature extremes $T_2$ and $T_3$ of the bond coat 20.

The benefits of this invention are achieved by forming the bond coat 20 to have a combination of high thermal conductivity with a graded thermal expansion intermediate that of a metal substrate and a ceramic thermal-insulating layer. The bond coat 20 of this invention attains these physical properties by forming the innermost bond coat layer 20a of an oxidation-resistant metallic constituent, forming the middle bond coat layer 20b to preferably have a composition that contains the same metallic constituent as the innermost layer 20a with additions of a chromium phase, and forming the outermost layer 20c to preferably contain the chromium phase of the middle layer 20b and at least one platinum-containing phase. The chromium phase and platinum-containing phase(s) are chosen on the basis of having coefficients of thermal conductivity near that of the metal substrate, yet whose CTEs are closer to that of ceramic materials typically used to form the thermal barrier coating of a TBC system Aluminum- and/or chromium-containing compositions and intermetallics (i.e., those containing alumina- and/or chromia-formers) are suitable as the metallic constituent for the innermost and middle layers 20a and 20b. Notable examples include diffusion aluminides (e.g., PtAl and NiAl), MCrAl (e.g., NiCrAl) and MCrAlY (e.g., NiCrAlY) in view of their proven reliability to resist oxidation and protect an underlying substrate. A preferred composition is MCrAlY containing the γ/γ' or γ/β nickel-base phases. As is known in the art, the γ phase is principally NiCr, the γ' is principally $Ni_3Al$, and the β phase is an intermetallic phase of nickel and aluminum (NiAl) in stoichiometric amounts.

According to this invention, the chromium phase in the middle and outermost layers 20b and 20c is preferably α-Cr, while the platinum-containing phase is (Pt,Ni)Al and/or (Ni,Pt,Cr,Al). The middle and outermost layers 20b and 20c also may contain chromium carbides such as $Cr_3C_2$ as a result of the chromium content in these layers. In a preferred embodiment, the middle layer 20b contains about 15 to about 25 volume percent α-Cr with the balance being essentially MCrAlY, and the outermost layer 20c contains about 25 to about 45 volume percent α-Cr, about 35 to about 60 volume percent (Pt,Ni)Al, and about 10 to about 30 volume percent (Ni,Pt,Cr,Al).

In view of the above, it can be seen that the individual layers of the bond coat 20 are formed to have different compositions to achieve the graded thermal expansion effect through the bond coat 20. With the above compositions, the bond coat layers have CTEs between that of the metal substrate and the thermal-insulating layer, with the CTE of the innermost layer (e.g., bond coat layer 20a) being closer to that of the metal substrate and the CTE of the outermost layer (e.g., bond coat layer 20c) being closer to that of the material for the thermal-insulating layer (e.g., a metal oxide). According to this invention, multilayer bond coats 20 having graded thermal expansion properties $(\alpha_s > \alpha_{b1} > \alpha_{b2} \alpha_{b3} > \alpha_t)$ yet near-metal thermal conductivities $(k_s, k_{b1}, k_{b2}, k_{b3} > k_t)$ minimizes the service temperature of the bond coat 20 while grading the thermal expansion of the layers that form the TBC, yielding a more spall-resistant TBC. An important and advantageous aspect of this invention is that the conductivity and expansion properties of the individual bond coat layers can be varied independently through the use of different amounts of the bond coat constituents, such that the stress distribution and temperature profile through the thermal barrier coating system can be developed, and therefore optimally, nearly independently of each other. Furthermore, the bond coat 20 of this invention contains sufficient levels of aluminum in its layers 20a, 20b and 20c to form the desired alumina scale for adhering the thermal-insulating layer 12. The constituents of the bond coat 20 also advantageously provide for ductility at service temperatures.

While the invention has been described in terms of a preferred embodiment, it is apparent that other forms could be adopted by one skilled in the art. Therefore, the scope of the invention is to be limited only by the following claims.

What is claimed is:

1. An article comprising:

a substrate having a coefficient of thermal expansion $\alpha_s$ and a coefficient of thermal conductivity $k_s$;

a bond coat comprising at least three layers, a first layer of the three layers being relatively nearer the substrate, a third layer of the three layers being relatively further from the substrate, and a second layer of the three layers being between the first and third layers, the first layer comprising a metallic constituent selected from the group consisting of aluminum- and chromium-containing intermetallics, MCrAl and MCrAlY, the second layer comprising the metallic constituent and a chromium phase, and the third layer comprising the chromium phase and at least one platinum-containing phase, the first, second and third layers having coefficients of thermal expansion $\alpha_{b1}$, $\alpha_{b2}$ and $\alpha_{b3}$, respectively, and having coefficients of thermal conductivity $k_{b1}$, $k_{b2}$ and $k_{b3}$, respectively; and a thermal-insulating layer on the bond coat, the thermal-insulating layer having a coefficient of thermal expansion $_t$ and a coefficient of thermal conductivity $k_t$;

wherein $\alpha_s > \alpha_{b1}$, $\alpha_{b2}$ and $\alpha_{b3}$; $\alpha_t < \alpha_{b1}$, $\alpha_{b2}$ and $\alpha_{b3}$; and $k_{b1}$, $k_{b2}$ and $k_{b3}$ are closer to $k_s$ than $k_t$.

2. An article as recited in claim 1, wherein $k_{b1}$, $k_{b2}$ and $k_{b3}$ are within about 20% of $k_s$.

3. An article as recited in claim 1, wherein $k_{b1}$, $k_{b2}$ and $k_{b3}$ are approximately equal.

4. An article as recited in claim 1, wherein $k_{b1}$, $k_{b2}$ and $k_{b3}$ are approximately equal to $k_s$.

5. An article as recited in claim 1, wherein as $\alpha_s > \alpha_{b1} > \alpha_{b2} > \alpha_{b3} > \alpha_t$.

6. An article as recited in claim 1, wherein the metallic constituent is a γ/γ' or γ/β nickel-base phase.

7. An article as recited in claim 1, wherein the chromium phase is α-Cr.

8. An article as recited in claim 1, wherein the platinum-containing phase is at least one phase selected from the group consisting of (Pt,Ni)Al and (Ni,Pt,Cr,Al).

9. An article as recited in claim 1, wherein the second and third layers further comprise chromium carbides.

10. An article as recited in claim 1, wherein the thermal-insulating layer is zirconia partially stabilized by yttria.

11. An article comprising:

a superalloy substrate having a coefficient of thermal expansion $\alpha_s$ and a coefficient of thermal conductivity $k_s$;

a bond coat comprising at least three layers, a first layer of the three layers being relatively nearer the substrate, a third layer of the three layers being relatively further from the substrate, and a second layer of the three layers being between the first and third layers, the first layer comprising a metallic constituent selected from the group consisting of aluminum- and chromium-containing intermetallics, MCrAl and MCrAlY, the second layer comprising the metallic constituent and α-Cr, and the third layer comprising α-Cr and at least one platinum-containing phase selected from the group consisting of (Pt,Ni)Al and (Ni,Pt,Cr,Al), the first, second and third layers having coefficients of thermal expansion $\alpha_{b1}$, $\alpha_{b2}$ and $\alpha_{b3}$, respectively, and having coefficients of thermal conductivity $k_{b1}$, $k_{b2}$ and $k_{b3}$, respectively; and a thermal-insulating ceramic layer on the bond coat, the thermal-insulating layer having a coefficient of thermal expansion $\alpha_t$ and a coefficient of thermal conductivity $k_t$;

wherein $\alpha_s > \alpha_{b1}$, $\alpha_{b2}$ and $\alpha_{b3}$; $\alpha_t > \alpha_{b1}$, $\alpha_{b2}$ and $\alpha_{b3}$; and $k_{b1}$, $k_{b2}$ and $k_{b3}$ are closer to $k_s$ than $k_t$.

12. An article as recited in claim 11, wherein $k_{b1}$, $k_{b2}$ and $k_{b3}$ are within about 20% of $k_s$.

13. An article as recited in claim 11, wherein $k_{b1}$, $k_{b2}$ and $k_{b3}$ are approximately equal.

14. An article as recited in claim 11, wherein $k_{b1}$, $k_{b2}$ and $k_{b3}$ are approximately equal to $k_s$.

15. An article as recited in claim 11, wherein $\alpha_s > \alpha_{b1} > \alpha_{b2} > \alpha_{b3} > \alpha_t$.

16. An article as recited in claim 11, wherein the second layer comprises by volume a greater amount of the metallic constituent than α-Cr.

17. An article as recited in claim 11, wherein the third layer comprises by volume a greater amount of α-Cr than either of the platinum-containing phases individually.

18. An article as recited in claim 11, wherein the third layer comprises by volume a greater amount of (Pt,Ni)Al than (Ni,Pt,Cr,Al).

19. An article as recited in claim 11, wherein the third layer comprises by volume about 25% to about 45% -Cr, about 35% to about 60% (Pt,Ni)Al, and about 10% to about 30% (Ni,Pt,Cr,Al).

20. An article as recited in claim 11, wherein the second and third layers further contain chromium carbides.

* * * * *